UNITED STATES PATENT OFFICE.

J. WILSON SWARTS, OF PHILADELPHIA, PENNSYLVANIA.

IMPROVEMENT IN CRAYONS.

Specification forming part of Letters Patent No. 201,067, dated March 5, 1878; application filed January 19, 1878.

*To all whom it may concern:*

Be it known that I, J. WILSON SWARTS, of the city and county of Philadelphia, and State of Pennsylvania, have invented a new and useful Improvement in Marking-Crayons, which improvement is fully set forth in the following specification.

In carrying out my invention, I dissolve in water eight parts of glue, and heat the liquid, to which I add a solution of carbonate of soda or other strong alkali—say one part—and boil the compound, so as to evaporate most of the water, the result being a hard saponification of the mass when cool.

I melt three parts of paraffine-wax, and combine the same with one part of the above mass at a high temperature, whereby body, density, and proper softness are imparted to said mass. Then I add coloring matter, and thoroughly mix the combined ingredients, which will afterward be poured into molds, or otherwise formed into sticks or pieces.

It is evident that vegetable or insect wax, and fatty or oily matters generally, may be employed in lieu of the paraffine-wax.

The crayon or marking substance, as made, will be found to be sufficiently hard. It will not bend, and it is not brittle and greasy, and the marks will be sharp and indelible.

I am aware that ingredients of a soapy nature, and oils, waxes, and fats, are common in crayons, and I therefore disclaim them; but by the combination of glue and alkali I produce, as it were, a hard saponification, which, unlike the combination of animal fat and alkali of general soapy nature, will assist in producing a crayon which cannot be washed out or off, is not affected by heat and cold, and will not soil the fingers, which results are attained by the employment of glue, (which is of a gelatinous nature,) the properties of which do not exist in soapy material, as so understood. Hence I believe that I have made an improvement in the art.

Having thus described my invention, what I claim as new, and desire to secure by Letters Patent, is—

Crayons composed of glue, alkali, and wax, substantially as and for the purpose set forth.

J. WILSON SWARTS.

Witnesses:
JOHN A. WIEDERSHEIM,
FRANK P. PRICHARD.